(12) United States Patent
Sweeney

(10) Patent No.: US 7,564,771 B2
(45) Date of Patent: Jul. 21, 2009

(54) BONDED PRE-RECORDED AND PRE-GROOVED OPTICAL DISC

(75) Inventor: Thomas I. Sweeney, Jermyn, PA (US)

(73) Assignee: Cinram International Inc., Scarborough (CA)

(*) Notice: Subject to any disclaimer, the term of this patent is extended or adjusted under 35 U.S.C. 154(b) by 688 days.

(21) Appl. No.: 11/181,156

(22) Filed: Jul. 14, 2005

(65) Prior Publication Data
US 2007/0014224 A1    Jan. 18, 2007

(51) Int. Cl.
G11B 7/24    (2006.01)
(52) U.S. Cl. .................. 369/275.1; 369/275.3; 720/718
(58) Field of Classification Search .................. 369/286, 369/275.1–275.5, 30.03, 47.26, 44.29; 720/718; 428/64.4
See application file for complete search history.

(56) References Cited

U.S. PATENT DOCUMENTS

| | | | |
|---|---|---|---|
| 5,247,494 A | 9/1993 | Ohno et al. | |
| 5,303,224 A | 4/1994 | Chikuma et al. | |
| 5,457,746 A | 10/1995 | Dolphin | |
| 5,540,966 A | 7/1996 | Hintz | |
| 5,815,333 A | 9/1998 | Yamamoto et al. | |
| 5,900,098 A | 5/1999 | Mueller et al. | |
| 5,903,531 A * | 5/1999 | Satoh et al. ............... | 369/44.29 |
| 5,923,640 A | 7/1999 | Takemura et al. | |
| 5,932,042 A | 8/1999 | Gensel et al. | |
| 5,978,322 A * | 11/1999 | Sugimoto et al. ........ | 369/47.26 |
| 5,991,798 A | 11/1999 | Ozaki et al. | |
| 6,031,808 A | 2/2000 | Ueno | |
| 6,035,329 A | 3/2000 | Mages et al. | |
| 6,047,292 A | 4/2000 | Kelly et al. | |
| 6,195,693 B1 | 2/2001 | Berry et al. | |
| 6,212,158 B1 | 4/2001 | Ha et al. | |
| 6,317,407 B1 | 11/2001 | Takemura et al. | |
| 6,317,779 B1 | 11/2001 | Gile et al. | |
| 6,341,375 B1 | 1/2002 | Watkins | |
| 6,396,798 B1 | 5/2002 | Takemura et al. | |
| 6,418,111 B1 | 7/2002 | Takemura et al. | |
| 6,438,232 B1 | 8/2002 | Mages et al. | |
| 6,480,462 B2 | 11/2002 | Ha et al. | |
| 6,564,255 B1 | 5/2003 | Mobini et al. | |
| 6,580,683 B1 | 6/2003 | Braitberg et al. | |
| 6,587,424 B2 | 7/2003 | Kuroda et al. | |
| 6,599,385 B1 * | 7/2003 | Liao et al. ................. | 156/272.2 |
| 6,628,603 B1 | 9/2003 | Kam et al. | |

(Continued)

FOREIGN PATENT DOCUMENTS

WO    WO 2004/021336    *    3/2004

OTHER PUBLICATIONS

U.S. Appl. No. 11/705,682, filed Feb. 13, 2007.

(Continued)

*Primary Examiner*—Ali Neyzari
(74) *Attorney, Agent, or Firm*—Cooper & Dunham, LLP

(57) ABSTRACT

An optical recording medium comprising a read-only type disc and a pre-grooved disc bonded back-to-back to the read-only type disc is provided. Content from the read-only type disc side of the optical recording medium can be reproduced through a standards-compliant optical media player. Content can be recorded by a standards-compliant optical media recorder on the pre-grooved disc side of the optical recording medium.

20 Claims, 3 Drawing Sheets

U.S. PATENT DOCUMENTS

| | | | |
|---|---|---|---|
| 6,678,237 B1 | 1/2004 | Edwards et al. | |
| 6,725,258 B1 | 4/2004 | Bick et al. | |
| 6,795,381 B2 * | 9/2004 | Ando et al. | 369/30.03 |
| 7,360,228 B2 * | 4/2008 | Van Den Oetelaar et al. | 720/718 |
| 2001/0042111 A1 | 11/2001 | Douzono | |
| 2003/0229679 A1 | 12/2003 | Yoo et al. | |
| 2004/0044900 A1 | 3/2004 | Wang et al. | |
| 2005/0013235 A1 * | 1/2005 | Yashiro et al. | 369/275.4 |
| 2006/0023598 A1 | 2/2006 | Babinski et al. | |
| 2006/0101634 A1 | 5/2006 | Sweeney | |
| 2006/0104190 A1 | 5/2006 | Babinski | |
| 2006/0165419 A1 | 7/2006 | Musto | |
| 2006/0181706 A1 | 8/2006 | Sweeney | |
| 2006/0222808 A1 | 10/2006 | Pickutoski et al. | |
| 2006/0270080 A1 | 11/2006 | Rinaldi | |
| 2006/0274617 A1 | 12/2006 | Musto et al. | |
| 2007/0008861 A1 | 1/2007 | Fumanti | |
| 2007/0029167 A1 | 2/2007 | Kelsch | |
| 2007/0090006 A1 | 4/2007 | Kelsch | |
| 2007/0098947 A1 | 5/2007 | Mueller | |

OTHER PUBLICATIONS

U.S. Appl. No. 11/715,249, filed Mar. 6, 2007.
U.S. Appl. No. 11/726,968, filed Mar. 22, 2007.
"Dual Layer DVD Recording", www.sonyburners.com, Jul. 11, 2005.
"DVD update: from double layers to blue lasers", www.findarticles.com, Jul. 11, 2005.
"Chip's CD Media Resource Center: CD-DA (Digital Audio) 1", www.chipchapin.com, Jul. 12, 2005.
"Will CD-PROM Prove CD-R's real Kodak Moment?—Company Business and Marketing", Oct. 28, 2004.
"Kodak has discontinued the direct marketing and sale of CD-PROM products effective Oct. 1, 2002", www.kodak.com./US/en/digital/progCDR, Oct. 28, 2004.
"Kodak , Intel to unveil disc product" www.news.com/2100-110-215995.html, Oct. 28, 2004.
"Kodak, UIT Will Integrate Technologies To Create Personalized, Visually Dynamic Internet Experience", Oct. 28, 2004.
"CDR-ROM", www.optical-disc.com/CDR_ROM.htm, Oct. 14, 2004.

* cited by examiner

FIG. 1A
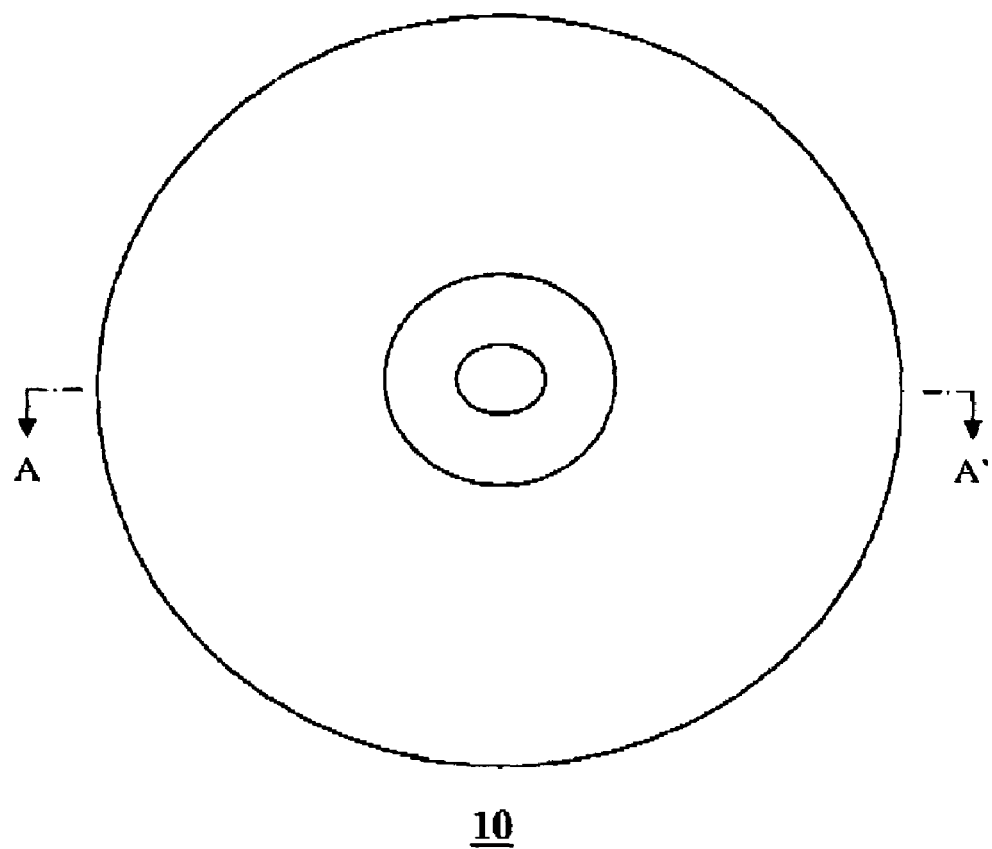
10
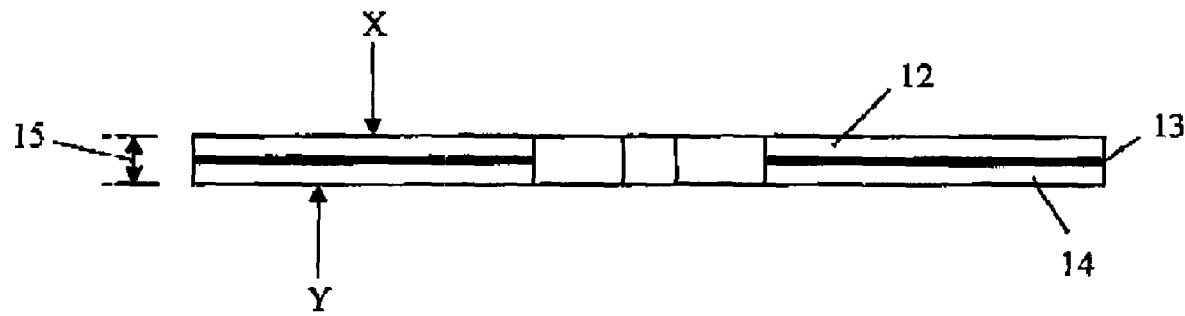
FIG. 1B

BONDED PRE-RECORDED AND PRE-GROOVED OPTICAL DISC

TECHNICAL FIELD

This application relates to optical media storage. In particular, the application relates to an optical recording media comprising a pre-recorded disc bonded to a pre-grooved disc.

DESCRIPTION OF RELATED ART

Use of CDs (compact discs) and DVDs (digital versatile discs or digital video discs) as optical storage media ("optical disc") for storing and transporting content (such as audio, video, graphics, computer software, etc.) in an optically readable manner has been popular for a number of years. Several formats of optical discs are currently available, including (A) read-only formats such as CD-DA (digital audio compact disc), CD-ROM (CD-read-only memory), DVD-ROM, and other formats wherein content is pre-recorded on the disc (such as by using an injection molding process), and (B) recordable formats in the form of (i) write-once read-many times formats such as CD-R (CD-recordable), and DVD+R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change Dual disk) and other phase change optical discs. Optical disc players for these optical discs use a red laser. Optical discs using a blue laser have also been introduced, such as HD DVD and BD (each of which includes read-only, recordable and rewritable formats).

In conventional read-only type optical discs (for example, CD-ROM, DVD-ROM, etc.), data is generally stored as a series of "pits" embossed in a plane of "lands". Microscopic pits formed in a surface of a plastic medium [for example, polycarbonate or polymethyl methacrylate (PMMA)] are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs generally are produced by an injection molding process. Initially, data representing the content to be recorded, encoded as a run length limited digital code (commonly known as an EFM signal in CD manufacturing) which contains its digital information in the timing between transitions, is used to control a laser beam recorder to form pits in a photoresist or a dye-polymer layer on an optical grade glass disc known as a glass master in a mastering process. A metallized glass master is used in an electroforming process to form (typically, metal) stampers. A stamper is used on one side of an injection molding cavity to emboss an information layer of pits and lands on a transparent polymer substrate formed by injection molding. The information bearing surface of the substrate is then covered with a reflective film (of metal or alloy) or the like. In the case of a CD, a plastic protective coating is applied over the film, and then art (for example, a picture, a design, text, etc.) is typically printed on the upper surface of the disc, to form an end product. In the case of DVDs, two half-thickness substrates are typically formed, metallization is applied to one (for example, DVD-5) or both (for example, DVD-10, DVD-9, DVD-18) half-thickness substrates, and the two half-thickness substrates are bonded by an adhesive (for example, hotmelt adhesive, ultraviolet light-cured adhesive, etc.). A second information layer can be formed for a DVD (for example, DVD-18) by applying a photo-polymer coating over a metallization layer applied to a substrate and the second information layer is embossed by a stamper into the photo-polymer layer which is then UV cured, metallized and protective coated.

Recordable type optical media typically include a spiral wobble groove in the substrate. The groove defines recording channels on the disc for recording data, provides information for tracking of the disc while writing or reading data, and has its wobble frequency modulated to contain addressing and other information for the write and read processes. The substrate (including information layer bearing the spiral wobble groove) can be formed by injection molding, using a stamper electroformed with a glass master. In addition, recordable-type optical media generally include at least a recording layer, and in addition a reflective layer (of metal or alloy) and a protective layer. Information is recorded in the recordable-type optical medium by directing a laser light beam modulated by signals to selectively change optical characteristics (reflectivity or extinction coefficient) of the recording layer. The recording layer in write-once read-many times optical media typically includes a photosensitive organic dye which is heated during recording to form irreversibly a pattern of marks or pits in the recording layer.

Each recording side of a rewritable disc also uses multiple layers beginning with a polycarbonate plastic substrate containing a shallow spiral groove extending from the inside to the outside diameter of the disc. A DVD-RW disc may additionally include pits and lands and a DVD-RAM disc also inside the groove itself. The substrates (including information layer bearing the spiral groove, land pre-pits and embossed areas) may be formed by injection molding, using a stamper electroformed with a glass master. Next in the multiple layers of a rewritable disc typically comes a dielectric layer, followed by a phase-change type recording layer having a polycrystalline structure, another dielectric layer and a reflective layer (of metal or alloy). Additional layers may also be incorporated above or below the dielectric layer, with a protective coating being applied as a last layer in single-sided optical media. During recording of the rewritable optical medium, the laser selectively heats tiny areas of the recording track to change the phase of each heated area from more crystalline into less crystalline (also known as "amorphous") phase, in order to create marks that can be called "pits" (the term "pit" is used broadly herein to cover, for example, a pit in a read-only type optical disc, and a pit or mark in a recordable or rewritable optical disc). During erase, the laser (in a process called "annealing") changes the amorphous areas back into more crystalline areas.

The term "pre-grooved disc" is used herein broadly to include any recordable and/or rewritable type optical disc.

The optical discs which are generally available typically embody one format only. That is, optical discs containing pre-recorded content generally do not include a recordable area for a content consumer to add additional data. Conversely, a pre-grooved disc typically does not include pre-recorded content. If a user wishes to carry around a pre-recorded disc and a pre-grooved disc for recording data, the user would need two individual optical discs.

While hybrid optical media which include a combination of formats have been proposed, they are generally not widely available and/or not popular among consumers, for a number of reasons. For example, the proposed hybrid media may not provide a full-length recordable area along with full-length pre-recorded content. The term "full-length" is used herein to refer to the data for an entire title (for example, an entire music album, an entire movie, an entire game, etc.).

In addition, the proposed hybrid media typically require a complex modification to the standard optical disc manufacturing process (for example, front-end modifications to the mastering encoder or the laser beam recorder) or an entirely new manufacturing process, requiring significant expense and commitment of resources by the optical disc manufacturer. Further, many of the hybrid discs have a higher cost per disc to the manufacturer because of the materials cost. Therefore, manufacturers may not be motivated to introduce hybrid optical media to the market, based on the economics of manufacturing such media.

In addition, the proposed hybrid media, when benefits and costs thereof are compared, may not provide consumers with sufficient motivation to want to buy them. In many instances, the cost to the consumer is not limited to the price of the media. For example, consumers may have additional expenses from obtaining software and/or hardware for recording and/or reproducing content to/from the media.

According to one hybrid optical recording disc, a read-only area and a recordable area are present on one side of the hybrid optical disc, with a wobble groove in the read-only area modulated by depressions in the substrate and extending into the substrate in the recordable area. See U.S. Pat. No. 6,480,462 to Ha et al. This technology was incorporated in the Kodak PictureCD product (but is not used in the current generation of the PictureCD product) and is sometimes referred to as CD-PROM technology. The CD-PROM PictureCD product included a hybrid optical recording disc wherein PictureCD software was pre-recorded in the read-only area of the disc, and the recordable area was available for recording JPEG image files (such as for scanned photos, digital camera files, graphics downloaded from the Internet, etc.) using the PictureCD software. The PictureCD software can index the image files and present them within the PictureCD application, bypassing the need to have a photofinisher create the disc.

U.S. Pat. No. 5,247,494 discusses an optical disc having a pre-recorded zone and a recordable (or rewritable) zone. However, such an optical disc is very complex to master and manufacture.

U.S. Pat. No. 5,923,640 discusses a single-sided multi-session hybrid disc having a read-only area and a recordable area. The information is readable from one side. However, such an optical disc is expensive and complex to master and to replicate.

U.S. Pat. No. 6,212,158 discusses a single sided multi-session hybrid disc having a read-only area and a recordable area. The information is readable from one side. However, such an optical disc is complex to master and to replicate.

U.S. Pat. No. 6,587,424 discusses a single sided multi-session hybrid having a read-only area and a recordable area. The information is readable from one side. However, such an optical disc is complex to master and to replicate.

U.S. Pat. No. 6,031,808 discusses a pre-recorded disc bonded to a rewritable disc. However, a modified front-end encoder is needed to obtain divided annular regions and divided sectorial regions on the disc. In addition, the divided annular regions and divided sectorial regions on two different layers may create bonding/reading issues. For example, the bonding must be precise. Further, the information is readable from one side, and therefore has a reduced recordable area potential.

Although these types of hybrid media allow potentially for distribution of pre-recorded content stored in one part of the medium along with provision of a recordable area onto which additional data and information can be selectively recorded by a user, such hybrid media require adaptations to current standards-compliant optical media players and recorders.

There is a need for user-friendly hybrid optical recording disc which includes a full-length recordable area along with full-length pre-recorded content, and allows one to record data in the recordable area using existing standards-compliant recorders without any modifications thereto, and reproduce content from the disc using existing standards-compliant players without any modifications thereto.

SUMMARY

This application describes an improved optical recording medium. In one embodiment, the optical recording medium includes a read-only type disc, and a pre-grooved disc bonded back-to-back to the read-only type disc. Content from the read-only type disc side of the optical recording medium can be reproduced through a standards-compliant optical media player. Content can be recorded by a standards-compliant optical media recorder onto the pre-grooved disc side of the optical recording medium.

The application also describes methodologies for manufacturing a hybrid optical recording medium. In one embodiment, a method for manufacturing a hybrid optical recording medium includes providing a read-only type optical disc storing pre-recorded content, and bonding a pre-grooved optical disc back-to-back to the read-only type optical disc. Content in the read-only type disc side of the optical recording medium can be reproduced through a standards-compliant optical media player. Content can be recorded by a standards-compliant optical media recorder onto the pre-grooved disc side of the optical recording medium disc.

BRIEF DESCRIPTION OF THE DRAWINGS

The features of the present application can be more readily understood from the following detailed description with reference to the accompanying drawings wherein:

FIG. 1A shows a plan view of an optical recording medium, according to an exemplary embodiment of the present disclosure;

FIG. 1B shows a sectional view of the optical recording medium cut along the line AA' shown in FIG. 1A;

DETAILED DESCRIPTION

This application provides an improved hybrid optical recording disc which can be manufactured using existing optical disc manufacturing technology. A pre-recorded disc is bonded back-to-back to a pre-grooved (recordable or rewritable) disc, so that the user obtains the benefit of enhanced portability of the optical format. This hybrid optical recording medium is referred generally in this disclosure as a "bonded pre-recorded and pre-grooved optical disc". Data can be recorded to the pre-grooved disc by utilizing existing optical disc recorders without modification. Content can be reproduced from the bonded pre-recorded and pre-grooved optical disc by existing optical disc drives and players without modification.

Some exemplary embodiments will be discussed below with reference to FIGS. 1A through 4.

An optical recording medium 10, according to an embodiment of this disclosure (FIGS. 1A and 1B), comprises a read-only disc 12 and a pre-grooved disc 14 bonded to the read-only disc 12 via a bonding agent 13. Content from the read-only type disc 12 can be reproduced through a standards-compliant optical media player. Content can be recorded by a standards-compliant optical media recorder-onto the pre-grooved disc 14. The pre-recorded content can be read from the read-only type disc X, and the bonded pre-recorded and pre-grooved optical disc can be flipped over so that additional content, stored on the pre-grooved disc 14, can be accessed from the pre-grooved disc side Y. Since the pre-recorded content and the additional content are accessed from the respective disc sides, the presently available technologies for manufacturing discs for the existing optical disc formats can be used, and no adaptations need to be made to standards-compliant optical media drives, players or recorders. Therefore, manufacturing costs, as well as the costs to consumers, are not increased.

Figure 2A:
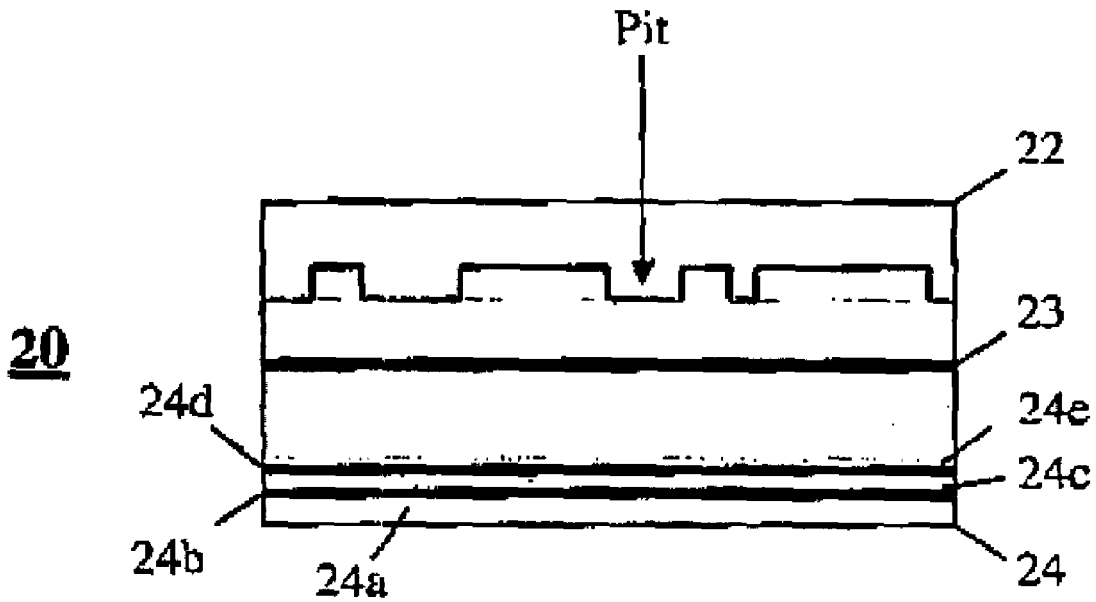
FIG. 2A shows a notional view along a track direction of a portion of an optical recording medium, according to an exemplary embodiment, comprising a rewritable disc bonded to a pre-recorded disc having a single information layer.
Figure 2B:
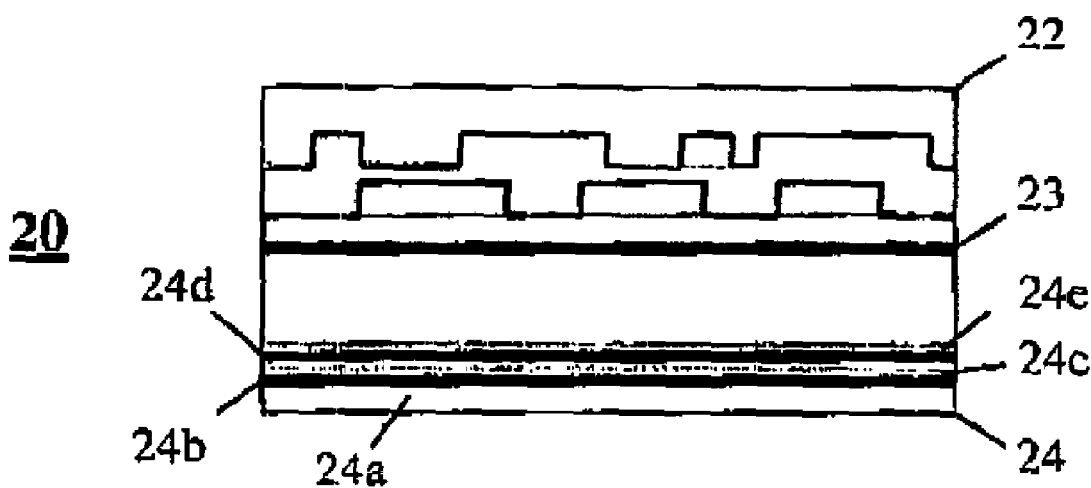
FIG. 2B shows a similar notional view of a portion of an optical recording medium, according to another exemplary embodiment, comprising a rewritable disc bonded to a pre-recorded disc having multiple information layers.

According to another exemplary embodiment, an optical recording disc 20 includes a read-only disc 22 and a rewritable disc 24 bonded to the read-only disc 22 via a bonding agent 23. The pre-recorded content can be stored on the read-only disc side 22 of the optical recording disc 20, on one information layer (FIG. 2A) or multiple information layers (FIG. 2B). The rewritable disc side 24 of the optical recording disc 20 can comprise, for example, polycarbonate 24a, protective layer 24b, recording layer 24c, protective layer 24d, reflective layer 24e and resin layer 24f, as well as one or more additional layers optionally.

Figure 3A:
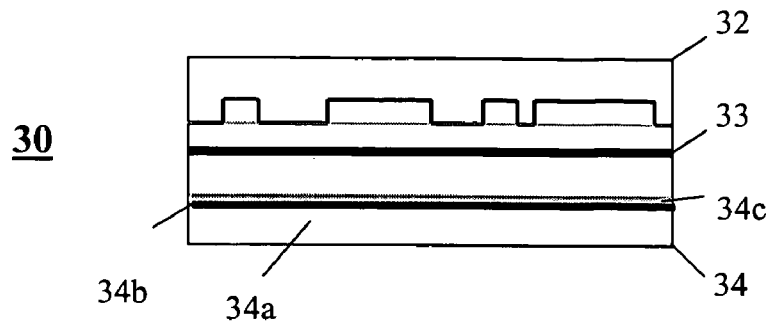
FIG. 3A shows a similar notional view of a portion of an optical recording medium, according to an exemplary embodiment, comprising a recordable disc bonded to a pre-recorded disc having a single information layer.
Figure 3B:
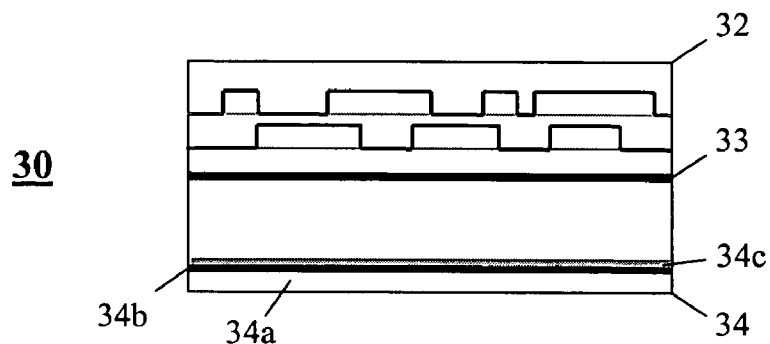
FIG. 3B shows a similar notional view of a portion of an optical recording medium, according to another exemplary embodiment, comprising a recordable disc bonded to a pre-recorded disc having multiple information layers.
Figure 4:
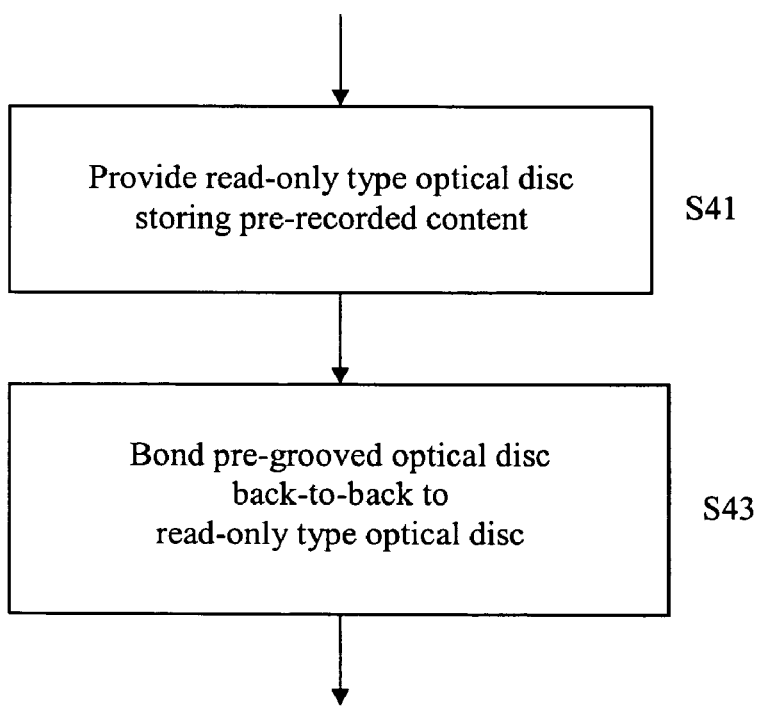
FIG. 4 shows a flow chart illustrating a method for manufacturing a hybrid optical recording medium, according to an exemplary embodiment.

In yet another exemplary embodiment, an optical recording disc 30 includes a read-only disc 32 and a recordable disc 34 bonded to the read-only disc 32 via a bonding agent 33. The pre-recorded content can be stored on the read-only disc side 32 of the optical recording disc 30, on one information layer (FIG. 3A) or multiple information layers (FIG. 3B). The recordable disc side 34 of the optical recording disc 30 can comprise, for example, polycarbonate 34a, reflective layer 34b, recording layer 34c, as well as one or more additional layers optionally.

A method for manufacturing a hybrid optical recording medium (FIG. 3) includes providing a read-only type optical disc storing pre-recorded content (step S31), and bonding a pre-grooved optical disc back-to-back to the read-only type optical disc (step S33). Content in the read-only type disc side of the optical recording medium can be reproduced through a standards-compliant optical media player. Content can be recorded by a standards-compliant optical media recorder onto the pre-grooved disc side of the optical recording medium disc.

The bonded pre-recorded and pre-grooved optical disc may be a combination including one or more HD-DVD (also referred to as AOD) formats or Blu-ray formats, bonded in accordance with this disclosure. HD-DVD and Blu-ray are two proposed formats, which are competing to be the standard for the next generation optical recording disc. Each of HD-DVD and Blu-ray provides a pre-recorded format and a pre-grooved format. Each format is designed for use with blue laser technology, in order to achieve higher data density, such as would be required for recording high definition video.

The bonded pre-recorded and pre-grooved optical disc is a pre-grooved disc bonded to a read-only disc. The pre-grooved disc can be compliant with standard CD-R/DVD-R, CD-RW/DVD-RW, CD-RAM/DVD-RAM or other pre-grooved media formats, depending on the application. The read-only disc can be any capacity or diameter, although preferably full-length. The read-only disc can be an injection molded disc containing prerecorded content or a recordable disc storing prerecorded content.

The bonded pre-recorded and pre-grooved optical disc is preferably produced by utilizing existing proven pre-recorded and pre-grooved mastering technologies and bonding the thin replicas back-to-back utilizing pre-existing bonding technologies (such as for manufacturing DVDs). Bonding techniques for bonding two thin discs back to back are discussed, for example, in U.S. Pat. Nos. 5,900,098 and 5,932,042, the entire contents of each of which are incorporated herein by reference.

The bonded pre-recorded and pre-grooved optical disc provides flexibility in that the disc includes pre-recorded and pre-grooved formats back-to-back on the same disc. The back-to-back bonding increases the potential content storage capabilities. Unlike other known proposals for hybrid discs, the improved hybrid optical recording disc can provide a full length pre-grooved area along with full length pre-recorded content.

A user of the improved hybrid optical recording disc does not need to carry two discs to playback pre-recorded content and record information, respectively. The improved hybrid optical recording disc allows additional data to be burned onto a recordable (or rewritable) disc while pre-recorded content is stored in the pre-recorded disc, in order to enable another level of user interactivity with an optical disc having pre-recorded content.

The pre-grooved disc can be used to burn any information which the user wishes to incorporate with the pre-recorded content. For example, a user can record on the pre-grooved disc additional personal favorites starring an artist whose latest album is pre-recorded on the pre-recorded disc of the same bonded disc. As another example, a user can download and store a prior release of a game on the pre-grooved disc, while the latest release of the game is pre-recorded on the pre-recorded disc of the same bonded disc. Similarly, a user can download and record a prior released movie on the pre-grooved disc, while the latest release of a movie is pre-recorded on the pre-recorded disc of the same bonded disc. Alternatively or in addition, the user can add personal or background information on the pre-grooved disc, regarding an actor who stars in the movie pre-recorded on the prerecorded disc.

For example, the content pre-recorded on the pre-recorded disc may include a full-length movie starring a popular actor (such as Tom Hanks), and the user can download and save on the pre-grooved disc another full-length movie starring the same actor (purchased from an authorized source), a video clip of one of the actor's Academy Award acceptance speeches, video clips from the actor's other performances (for example, television appearances), videos of one or more interviews of the actor, etc.

The additional content added to the pre-grooved disc need not be tied to a particular actor and can be related instead by a common subject (for example, new releases, Oscar winners, etc.), genre (for example, action, comedy, cooking, drama, sports, etc.), source (for example, a particular studio, a particular computer game maker, etc.), etc., or may even be entirely unrelated at all to the prerecorded content.

The pre-recorded disc can include in addition to the pre-recorded content, authorization information for additional (related or unrelated) content to be downloaded from a specified content source via one or more computer networks (such as the Internet) or other (wired or wireless) telecommunicative networks (for example, dial-up to a content database). The authorization information preferably specifies the content that can be recorded on the pre-grooved disc of the optical recording medium.

Numerous other applications of a hybrid optical recording disc are disclosed in commonly-owned application Ser. No. 10/987,768, filed Nov.12, 2004 and entitled "SECURE OPTICAL MEDIA STORAGE", the entire contents of which are incorporated herein by reference.

As mentioned above, one of the advantages of the bonded pre-recorded and pre-grooved optical disc is that data can be recorded to the pre-grooved disc of the bonded pre-recorded and pre-grooved optical disc by utilizing existing standards-compliant recorders without modification, and content can be reproduced from the bonded pre-recorded and pre-grooved optical disc by existing standards-compliant disc drives and players without modification. Therefore, the disc 10 preferably has a thickness 15 in a range of 1.1 mm to 1.5 mm.

In describing exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

In addition, the above specific embodiments are illustrative, and many variations can be introduced on these embodiments without departing from the spirit of the disclosure or from the scope of the appended claims. For example, elements and/or features of different illustrative and exemplary embodiments herein may be combined with each other and/or substituted for each other within the scope of this disclosure and appended claims.

What is claimed is:

1. An optical recording medium comprising:
   a read-only type disc; and
   a pre-grooved disc bonded to the read-only type disc,
   wherein said optical recording medium the pre-grooved optical disc to the read-only type optical disc includes a read-only type disc side and a pre-grooved disc side that is different from the read-only type disc side,
   wherein content from the read-only type disc of the optical recording medium is reproduced from the read-only type disc side of the recording medium, and
   wherein content is recorded onto the pre-grooved disc of the optical recording medium through the pre-grooved disc side of the optical recording medium.

2. An optical recording medium as claimed in claim 1, wherein said read-only type disc of the optical recording medium includes a plurality of pits configured to store a pre-recorded full-length title.

3. An optical recording medium as claimed in claim 1, wherein said read-only type disc of the optical recording medium includes a plurality of pits configured to store an entire movie.

4. An optical recording medium as claimed in claim 1, wherein said read-only type disc of the optical recording medium includes a plurality of pits configured to store an entire music album.

5. An optical recording medium as claimed in claim 1, wherein said read-only type disc of the optical recording medium includes a plurality of pits configured to store an entire game.

6. An optical recording medium as claimed in claim 1, wherein said read-only type disc of the optical recording medium includes in addition to pre-recorded content, a plurality of pits configured to store authorization information for additional content to be downloaded from a specified content source.

7. An optical recording medium as claimed in claim 1, wherein said read-only type disc of the optical recording medium includes in addition to pre-recorded content, plurality of pits configured to store authorization information specifying content that that is authorized to be recorded onto the pre-grooved disc side of the optical recording medium.

8. An optical recording medium as claimed in claim 1, wherein said read-only type disc of the optical recording medium stores pre-recorded content, and said pre-grooved disc of the optical recording medium is recordable.

9. An optical recording medium as claimed in claim 1, wherein said read-only type disc of the optical recording medium stores pre-recorded content, and said pre-grooved disc of the optical recording medium is rewritable.

10. An optical recording medium as claimed in claim 1, wherein said read-only type disc comprises a plurality of information layers.

11. An optical recording medium as claimed in claim 1, wherein said pre-grooved disc of the optical recording medium includes a data capacity for recording full-length content.

12. An optical recording medium as claimed in claim 1, wherein said pre-grooved disc of the optical recording medium includes a data capacity for storing an entire movie.

13. An optical recording medium as claimed in claim 1, wherein said pre-grooved disc of the optical recording medium includes a data capacity for storing an entire music album.

14. An optical recording medium as claimed in claim 1, wherein said pre-grooved disc of the optical recording medium includes a data capacity for storing an entire game.

15. An optical recording medium as claimed in claim 1, wherein the optical recording medium including said pre-grooved disc bonded to said read-only type disc has a thickness in a range of 1.1mm to 1.5mm.

16. A method for manufacturing a hybrid optical recording medium, the method comprising:
   providing a read-only type optical disc storing pre-recorded content; and
   bonding a pre-grooved optical disc to the read-only type optical disc,
   wherein said optical recording medium comprising the pre-grooved optical disc to the read-only type optical disc includes a read-only type disc side and a pre-grooved disc side that is different from the read-only type disc side,
   wherein content in the read-only type disc of the optical recording medium is reproduced from the read only-type disc side of the optical recording medium, and wherein content is recorded onto the pre-grooved disc of the optical recording medium through the pre-grooved disc side of the optical recording medium.

17. The method of claim 16, wherein said read-only type disc of the optical recording medium includes a plurality of pits configured to store a pre-recorded full-length title.

18. The method of claim 16, wherein said pre-grooved disc of the optical recording medium has a data capacity for recording full-length content.

19. The method of claim 16, wherein said read-only type disc of the optical recording medium includes in addition to pre-recorded content, a plurality of pits configured to store authorization information for additional content to be downloaded from a specified content source.

20. The method of claim 16, wherein said read-only type disc of the optical recording medium includes in addition to pre-recorded content, a plurality of pits configured to store authorization information specifying content that is authorized to be recorded onto the pre-grooved disc of the optical recording medium.

* * * * *